CORRECTION OF FREQUENCY SHIFT IN CARRIER SYSTEMS

Filed Jan. 3, 1966

INVENTORS R. L. HANER
N. L. MAJOR
BY R B Anders
ATTORNEY 3,447,084
Patented May 27, 1969

3,447,084

CORRECTION OF FREQUENCY SHIFT IN CARRIER SYSTEMS

Robert L. Haner, Andover, Mass., and Norman L. Major, Plaistow, N.H., assignors to Bell Telephone Laboratories, Incorporated, New York, N.Y., a corporation of New York Filed Jan. 3, 1966, Ser. No. 518,281
Int. Cl. H04b *1/68, 1/16*
U.S. Cl. 325—49 2 Claims

ABSTRACT OF THE DISCLOSURE

In order to eliminate the frequency error of a type-N repeatered line, the demodulating carrier at the final group demodulator is derived from a local voltage-controlled oscillator. The latter is controlled by a pair of phase-locked loops, one of which has a broad capture range on either side of one of the received channel carriers and the other of which is sharply tuned to the selected channel carrier frequency and has a high discrimination against nearby frequencies. A switching control circuit selects the appropriate loop.

This invention relates generally to the transmission of signals by amplitude modulation carrier techniques and more particularly, although in its broader aspects not exclusively, to the transmission of a group of channel sidebands on a suppressed carrier over media which tend to introduce unwanted frequency shifts.

When channel sidebands are transmitted on a suppressed group carrier over a medium which introduces a frequency shift, the received sidebands will be distorted if a carrier wave equal to the original group carrier in frequency is used to accomplish group demodulation. Distortion will occur regardless of whether individual channel carriers are transmitted along with any of their respective sidebands. The channel carriers and sidebands will have undergone frequency shifts not shared by the demodulating group carrier and the demodulated channel sidebands will incur not only frequency errors when channel carriers are not transmitted but also quality degradation due to misalignment with receiving band filters. In the past, it has been possible to avoid such distortions by manual adjustment of the demodulating group carrier to cancel the frequency shift, by taking special measures to keep the amount of frequency shift introduced by the transmission medium within narrow limits, or by deriving a demodulating group carrier with the correct frequency to cancel the frequency shift by frequency multiplication and intermodulation techniques.

There are a number of reasons why none of these known frequency correcting expedients may be desirable. Manual adjustment of the demodulating group carrier frequency would, for example, require a separate adjustment for every change in operating conditions. Controlling the frequency shift introduced by the transmission medium within narrow limits, on the other hand, tends to require relatively complex and expensive apparatus and is subject to failure in the even of failure of any portion of the controlling mechanism. Deriving a demodulating group carrier with the correct frequency to cancel the frequency shift by frequency multiplying and intermodulation techniques, finally, relies upon relatively wide pick-off filters to select transmitted pilot frequencies or channel carriers undergoing the same frequency shift and thus degrades the noise performance of the system.

A principal object of the invention is, therefore, to eliminate frequency errors in systems of the type described over a broad frequency range without resorting to either manual adjustments or measures to limit the amount of frequency shift in the transmission medium.

A closely related object is to eliminate frequency errors in systems of the type described over as broad a frequency range as possible.

Typical amplitude modulation carrier transmission systems which tend to introduce a certain amount of frequency deviation are the standard short-haul Bell System carrier telephone transmission systems of the so-called N family. All transmit groups of channel sidebands on a suppressed group carrier. Repeaters are spaced at intervals along each system, and, at each repeater point, a local group carrier is generated to modulate (or demodulate, depending upon the point of view) the group either from a low frequency band to a high frequency band or vice versa. Such alternation and inversion of channels between low and high frequency bands is known in the art as frequency frogging and tends to provide equalization and reduce crosstalk in the individual channels. Any instability or inaccuracy in the locally generated group carrier frequencies, however, will result in a frequency shift which is cumulative throughout the system. If it reaches an order of magnitude of 100 cycles or more, it can result in degradation of channel frequency characteristics because of misalignment of the frequency spectrum with respect to the receiving channel band filters and voice frequency equalizers. In addition, while the frequency shift may be otherwise tolerable for normal transmission of channel sidebands which are accompanied by their own channel carriers, it may not be acceptable for transmission of channel sidebands whose channel carriers are suppressed or for transmission of program and certain types of data signals which are not accompanied by their own carriers and hence require more faithful reproduction of frequency.

In accordance with the invention, a variable frequency oscillator is employed to supply the demodulating group carrier at the receiving station in a system of this type and its frequency is controlled from either a pilot signal transmitted along with the channel sidebands or one of the transmitted channel carriers by a pair of phase-locked loops, one having a broad capture range on either side of the nominal frequency of the received pilot or selected channel carrier and the other having a narrower capture range and a higher discrimination against nearby frequencies. In accordance with a particular feature of the invention, switching is provided to activate the narrow loop and disable the broad loop whenever the received pilot or selected channel carrier comes within the capture range of the narrow loop. In this manner, large frequency shifts along the transmission medium may be corrected without any necessity of clearing a large frequency space on either side of the received pilot or selected channel carrier.

In one particularly useful embodiment of the invention, paths forming the two phase-locked loops interconnect the output side of the receiving group demodulator and the variable frequency oscillator and share a common phase detector. The phase detector compares the phase of the received pilot of the frequency or selected channel carrier at the output side of the receiving group demodulator with that of a local reference signal source and delivers a controlling voltage to the variable frequency oscillator. The reference signal source operates at the nominal frequency of the received pilot frequency or selected channel carrier. Between the phase detector and the variable frequency oscillator generating the demodulating group carrier is a low-pass transmission path switchable from a first cut-off frequency to a second cutoff frequency at least several times lower than the first. This low-pass transmission path determines the capture ranges of the two loops and may take the form of either separately switched low-pass filters or a single low-pass filter with switched elements. To control the switching, a narrow band pick-off filter, tuned to the nominal frequency of the received pilot or selected channel carrier, is connected to the output side of the receiving group demodulator. A relay which activates the narrow loop and disables the broad loop by switching from the high to the low cutoff frequency in the low-pass transmission path between the phase detector and the variable frequency oscillator is operated with a short delay when the received pilot or selected channel carrier comes within the range of the pick-off filter.

A more complete understanding of the invention, along with its various objects and features, may be obtained from a study of the following detailed description of a specific embodiment. In the drawing.

Figure 1:
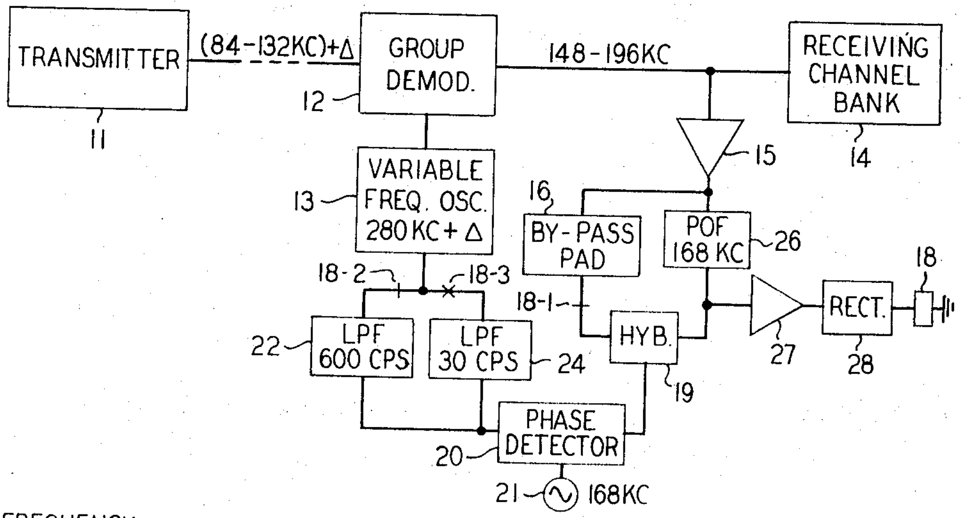
FIG. 1 is a block diagram showing frequency correcting apparatus embodying the invention.

In the embodiment of the invention illustrated in FIG. 1, the incoming signal from the transmitting station 11, the carrier line, and preceding portions of the receiving station consists of twelve single sideband message channels and six transmitted carriers, nominally in the 84 kc. to 132 kc. portion of the frequency spectrum. This signal can be shifted in frequency by as much as 150 cycles, represented by the symbol Δ in FIG. 1, at the input to receiving group demodulator 12. By supplying a nominal demodulating group carrier of 280 kc. to group demodulator 12 from a variable frequency oscillator 13 and selecting the lower sideband output, the twelve channel sidebands and six transmitted channel carriers are supplied to a receiving channel bank 14 in the frequency range from 148 kc. to 196 kc.

The paths forming the two phase-locked loops featured by the invention connect the output side of group demodulator 12 and the control terminal of variable frequency oscillator 13. The initial element connected to the output side of group demodulator 12 is a bridging amplifier 15. Amplifier 15 is shared by both loops and contains a resonant circuit to provide broad selectivity in the vicinity of 168 kc., the nominal frequency of one of the received channel carriers. From the output side of amplifier 15, a by-pass resistance pad 16 is connected through a break contact 18–1 of a relay 18 to one of the two conjugate inputs of a hybrid network 19. As will be explained later, by-pass pad 16 forms part of the broad loop only.

The output side of hybrid network 19 is connected to the input of a phase detector 20. Phase detector 20 compares the instantaneous phase of the selected channel carrier received from hybrid network 19 with that of a reference wave provided by a precise local source 21 operating at the nominal frequency of that channel carrier, i.e., 168 kc. The relatively low frequency (nominally D-C) output from phase detector 20 is supplied through a low-pass transmission path to the control terminal of variable frequency oscillator 13. As illustrated in FIG. 1, the broad loop, which has a capture range of approximately 600 cycles, includes a low-pass filter 22 and a break contact 18–2 of relay 18. The narrow loop, which has a capture range of approximately 30 cycles, includes a low-pass filter 24 and a make contact 18–3 of relay 18.

Switching control in the embodiment of the invention illustrated in FIG. 1 is provided at the output side of amplifier 15, where a pick-off filter 26, sharply tuned to 168 kc., the nominal frequency of the selected channel carrier, is connected to provide a path between amplifier 15 and the second conjugate input of hybrid network 19.

At the output side of pick-off filter 26, an amplifier 27 and a rectifier 28 are connected in tandem to control the operating coil of relay 18.

Initially, the output from group demodulator 12 may be shifted in frequency by as much as 500 cycles because of the line shift error Δ and error in free-running variable frequency oscillator 13. Since the pass band of pick-off filter 26 is only about 50 cycles wide (i.e., 25 cycles on either side of 168 kc.), transmission through relay control amplifier 27 and rectifier 28 is blocked. Relay 18 is therefore released, the broad loop is activated, and the narrow loop is disabled. The output signal from bridging amplifier 15 is transmitted through by-pass pad 16 and hybrid network 19 to the input side of phase detector 20. The output of phase detector 20 is supplied to variable frequency oscillator 13 through a low-pass filter 22, completing the wide-band loop which acts to bring the output of oscillator 13 to a frequency of 280 kc. plus Δ. The broad loop has effective capture range determined by the characteristic of low-pass filter 22, or substantially 600 cycles.

As oscillator 13 corrects its frequency, the band of frequencies put out by group demodulator 12 shifts until the selected channel carrier approaches its nominal frequency of 168 kc. As this point is approached, the selected channel carrier passes through pick-off filter 26 to hybrid network 19. The switching control circuit made up by amplifier 27 and rectifier 28 senses this energy and, after a short time delay, operates relay 18. Operation of relay 18 opens the path through by-pass pad 16 to hybrid network 19 by opening break contacts 18–1 and substitutes low-pass filter 24 for low-pass filter 22 to enable the second or narrow loop by closing make contact 25. The first or broad band loop is disabled by the opening of break contact 23.

The narrow band loop has a capture range much narrower than the broad band loop. Because of the properties of phase detector 20, it is determined by the characteristics of low-pass filter 24 and is only of the order of 30 cycles wide. The narrow loop presents a high degree of discrimination, however, against signal energy in the vicinity of the 168 kc. channel carrier. This discrimination is provided by low-pass filter 24 and pick-off filter 26. The narrow loop is therefore able to function to eliminate any remaining frequency error Δ without necessitating that any substantial band of frequences on either side of the selected channel carrier be cleared.

As mentioned above, a small amount of time delay is provided by amplifier 27 in the control path for relay 18. This delay postpones the switching of the wide band loop for an instant until the selected channel carrier is well within the range of the narrow loop. In this manner, transient conditions in which the circuit might otherwise tend to switch back and forth between loops are avoided.

Figure 2:
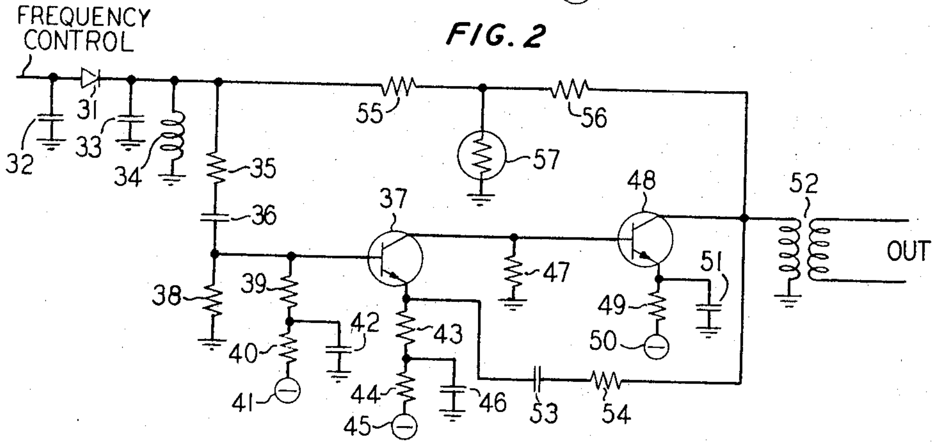
FIG. 2 illustrates a variable frequency oscillator which may be used in the embodiment of the invention shown in FIG. 1.
Figure 3:
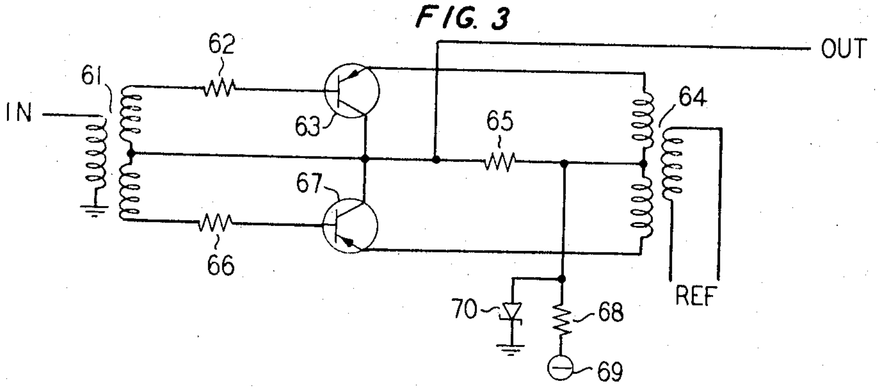
FIG. 3 illustrates a phase detector which may be used in the embodiment of the invention shown in FIG. 1.

Although the embodiment of the invention illustrated in FIG. 1 requires no component circuits which are not conventional, circuits which may be used to advantage as variable frequency oscillator 13 and phase detector 20 are shown in detail in FIGS. 2 and 3 respectively.

As shown in FIG. 2, the output from phase detector 20 received from either low-pass filter 22 or low-pass filter 24 is applied to the anode of a varactor diode 31. The anode of varactor diode 31 is connected to ground through a capacitor 32 and the cathode is connected to ground through the parallel combination of capacitor 33 and inductor 34. The cathode of varactor diode 31 is also connected through the series combination of a resistor 35 and a blocking capacitor 36 to the base electrode of a n-p-n transistor 37. Base bias for transistor 37 is provided by a resistor 38 connected from the base electrode to ground and by the series combination of a pair of resistors 39 and 40 connected between the base electrode and a negative voltage source 41. A by-pass capacitor 42 is connected to ground from the junction between resistors 39 and 40. Emitter bias for transistor 37 is provided by a pair of resistors 43 and 44 connected in series between the emitter electrode and a negative voltage source 45. A by-pass capacitor 46 is returned to ground from the junction between resistors 43 and 44.

The collector electrode of transistor 37 is connected to ground through a resistor 47 and directly to the base electrode of a second n-p-n transistor 48. The emitter electrode of transistor 48 is connected through a resistor 49 to a negative voltage source 50. A by-pass capacitor 51 is returned to ground from the emitter electrode of transistor 48. The primary winding of an output transformer 52 is connected between the collector electrode of transistor 48 and ground. The secondary winding of output transformer 52 supplies the demodulating group carrier to group demodulator 12 in FIG. 1.

Transistors 37 and 48 in FIG. 2 and their associated components form a two-stage common emitter transistor amplifier. Negative feedback for stability is provided by a capacitor 53 and a resistor 54 connected in series between the collector electrode of transistor 48 and the emitter electrode of transistor 37. Positive feedback for oscillation is provided by a pair of resistors 55 and 56 connected in series from the collector electrode of transistor 48 to resistor 35 in the base lead of transistor 37. A power limiting thermistor 57 is returned to ground from the junction between resistors 55 and 56.

Varactor diode 31, capacitors 32 and 33, and inductor 34 form a tank circuit in the positive feedback path of the oscillator illustrated in FIG. 2 and control its operating frequency. Varactor diode 31, the capacitance of which varies with applied voltage, is the variable element. When the selected channel carrier applied to phase detector 20 in FIG. 1 is not shifted in frequency and is in phase with the reference signal from source 21, the output of the oscillator is exactly 280 kc. When the frequency of the selected channel carrier is low, representing a positive value of $\Delta$ in the signal received from transmitter 11, the frequency correcting voltage applied to varactor diode 31 increases, causing the capacitance of varactor diode 31 to decrease and the operating frequency of the oscillator to increase sufficiently to cancel the frequency error. When the frequency of the selected channel carrier is high, representing a negative value of $\Delta$ in the signals received from transmitter 11, the frequency correcting voltage applied to varactor diode 31 decreases, causing the capacitance of varactor diode 31 to increase and the operating frequency of the oscillator to decrease sufficiently to cancel the frequency error.

As shown in FIG. 3, the selected channel carrier input to the phase detector is applied to the primary winding of a main input transformer 61. The secondary winding of transformer 61 is center-tapped and one end is connected through a biasing resistor 62 to the base electrode of a p-n-p transistor 63. The collector electrode of transistor 63 is connected to the center tap of the secondary winding of transformer 61, and the emitter electrode is connected to one end of the center-tapped secondary winding of the reference input transformer 64. A resistor 65 is connected between the mid-point of the secondary winding of transformer 64 and the collector electrode of transistor 63 to provide an optimum load for the phase detector.

The other end of the secondary winding of main input transformer 61 in FIG. 3 is connected through a resistor 66 to the base electrode of a second p-n-p transistor 67. The collector electrode of transistor 67 is connected directly to the collector electrode of transistor 63 and the emitter electrode is connected to the other end of the secondary winding of reference input transformer 64. The reference signal is applied to the primary winding of transformer 64 and the phase detector output is taken from the collector electrode of transistor 63 and 67. A voltage bias for the output, designed primarily to provide a bias for varactor diode 31 in the variable frequency oscillator shown in FIG. 2, is provided by a resistor 68 connected from the mid-point of the secondary winding of transformer 64 to a negative voltage source 69. A breakdown diode 70 is connected from the mid-point of that winding to ground to provide regulation of the bias magnitude.

The phase detector illustrated in FIG. 3 is a double-balanced switching circuit which compares the phase of the signal received through transformer 61 with that of the reference signal received through transformer 64. The amplitude of the output voltage derived at the collector electrode of transistors 63 and 67 depends upon the magnitude and direction of the phase difference.

It is to be understood that the above-described arrangements are illustrative of the application of the principles of the invention. Numerous other arrangements may be devised by those skilled in the art without departing from the spirit and scope of the invention.

What is claimed is:

1. In an amplitude modulation system for transmitting a group of channel sidebands from a transmitting station to a receiving station on a group carrier over a transmission medium which tends to impart an unwanted frequency shift to the transmitted sidebands, individual channel carriers accompanying at least some of said sidebands but said group carrier being suppressed from transmission, a demodulator at said receiving station, a variable frequency oscillator connected to supply a demodulating group carrier to said demodulator, a reference signal source having a frequency equal to the nominal frequency of one of the received channel carriers at the output side of said demodulator, a phase-detector having its output connected to control said variable frequency oscillator and its respective inputs connected to said source and the output side of said demodulator, whereby any phase difference between said source and the selected channel carrier is reflected as a voltage supplied to said variable frequency oscillator, a low-pass transmission path intervening between said phase detector and said variable frequency oscillator having a cut-off frequency switchable from a first frequency to a second frequency at least several times lower than said first frequency, and means to switch the cut-off frequency of said low-pass transmission path from said first frequency to said second frequency whenever the frequency of the selected channel carrier comes within a predetermined frequency of the frequency of said oscillator.

2. An amplitude modulation carrier transmission system in accordance with claim 1 in which a narrow band pick-off filter tuned to the frequency of said source is connected between the output side of said demodulator and said phase detector, a relay is connected to the output side of said pick-off filter to operate whenever the selected channel carrier falls within its pass band, the cut-off frequency of said low-pass transimission path is switched to said first frequency whenever said relay is released, the cut-off frequency of said low-pass transmission path is switched to said second frequency whenever said relay is operated, a path is connected to by-pass said pick-off filter and said relay whenever said relay is released, and said by-pass path is opened whenever said relay is operated.

References Cited

UNITED STATES PATENTS

| | | | |
|---|---|---|---|
| 2,730,616 | 1/1956 | Bastow | 325—422 |
| 2,794,910 | 6/1957 | Arends | 325—329 |
| 3,176,226 | 3/1965 | Berger | 325—49 |
| 3,202,765 | 8/1965 | Byrne | 179—15 |
| 3,217,255 | 11/1965 | Broadhead et al. | 325—420 X |

ROBERT L. GRIFFIN, *Primary Examiner.*

BENEDICT V. SAFOUREK, *Assistant Examiner.*

U.S. Cl. X.R.

325—63, 421